(12) United States Patent
Collins

(10) Patent No.: US 6,917,819 B2
(45) Date of Patent: Jul. 12, 2005

(54) SYSTEM AND METHOD FOR PROVIDING A SUBSCRIBER DATABASE USING GROUP SERVICES IN A TELECOMMUNICATION SYSTEM

(75) Inventor: David Allan Collins, Garland, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 532 days.

(21) Appl. No.: 10/038,879

(22) Filed: Dec. 31, 2001

(65) Prior Publication Data
US 2003/0125085 A1 Jul. 3, 2003

(51) Int. Cl.$^7$ ................................................ H04B 1/38
(52) U.S. Cl. .................... 455/560; 455/550.1; 455/418; 455/220.01
(58) Field of Search ............................ 455/560, 550.1, 455/418, 424, 428, 433, 507, 554.1, 554.2, 533.1, 561, 556.1, 426.1, 426.2, 422.1; 709/224, 226, 245, 229, 203, 213, 100; 395/200.53, 200.56, 675, 674, 650, 200.59, 200.75, 822, 200.31, 700, 200.32, 200.48; 714/4; 379/57, 221, 222, 223, 309, 201.03, 229, 221.08, 352, 395.6

(56) References Cited

U.S. PATENT DOCUMENTS

| | | | |
|---|---|---|---|
| 5,754,959 A | | 5/1998 | Ueno et al. |
| 5,995,831 A | * | 11/1999 | Gulliford et al. ........ 455/426.1 |
| 6,128,657 A | * | 10/2000 | Okanoya et al. ............ 709/224 |
| 6,134,216 A | | 10/2000 | Gehi et al. |
| 6,574,477 B1 | | 6/2003 | Rathunde |
| 6,598,071 B1 | | 7/2003 | Hayashi et al. |
| 6,671,259 B1 | | 12/2003 | He et al. |
| 6,681,001 B1 | | 1/2004 | Clayton et al. |
| 2003/0005350 A1 | * | 1/2003 | Koning et al. .................. 714/4 |
| 2003/0065921 A1 | | 4/2003 | Chang |
| 2004/0039820 A1 | | 2/2004 | Colby et al. |

* cited by examiner

Primary Examiner—Edward F. Urban
Assistant Examiner—Charles Chow (57) ABSTRACT

A system for providing a subscriber database using group services in a telecommunication system. The system comprises a switch for executing call processing applications and N call application nodes for executing subscriber database server applications. A first subscriber database server application is executed on a first call application node and a second subscriber database server application is executed on a second call application node. The first and second subscriber database server applications form a subscriber database load sharing group server application. When a subscriber database service request is received, the subscriber database load sharing group server application selects one of the first and second subscriber database server applications to perform the subscriber database service request according to a load distribution algorithm.

27 Claims, 7 Drawing Sheets

SYSTEM AND METHOD FOR PROVIDING A SUBSCRIBER DATABASE USING GROUP SERVICES IN A TELECOMMUNICATION SYSTEM

CROSS-REFERENCE TO RELATED APPLICATIONS

The present invention is related to those disclosed in the following United States Non-Provisional Patent Applications:
1) U.S. patent application Ser. No. 10/038,878 filed concurrently herewith, entitled "SYSTEM AND METHOD FOR DISTRIBUTED CALL PROCESSING USING LOAD SHARING GROUPS."
2) U.S. patent application Ser. No. 10/039,186 filed concurrently herewith, entitled "SYSTEM AND METHOD FOR DISTRIBUTED CALL PROCESSING USING A DISTRIBUTED TRUNK IDLE LIST";
3) U.S. patent application Ser. No. 10/038,872 filed concurrently herewith, entitled "DISTRIBUTED IDENTITY SERVER FOR USE IN A TELECOMMUNICATION SWITCH";

The above applications are commonly assigned to the assignee of the present invention. The disclosures of these related patent applications are hereby incorporated by reference for all purposes as if fully set forth herein.

TECHNICAL FIELD OF THE INVENTION

The present invention is directed, in general, to telecommunication systems and, more specifically, to a telecommunication system that uses group services to provide an improved subscriber database.

BACKGROUND OF THE INVENTION

There are presently over 300 million customers worldwide for cellular telephones and other wireless devices. A significant percentage of these wireless devices are being used as a "data pipe" (i.e., voice traffic is not the primary function). Within the United States, cellular service is offered by cellular service providers, by the regional Bell companies, and by the national long distance operators. The enhanced competition has driven the price of cellular service down to the point where it is affordable to a large segment of the population.

The current generation of cellular phones is used primarily for voice conversations between a subscriber device (or wireless device) and another party through the wireless network. A smaller number of wireless devices are data devices, such as personal digital assistants (PDAs) equipped with cellular/wireless modems. Because the bandwidth for a current generation wireless device is typically limited to a few tens of kilobits per second (Kbps), the applications for the current generation of wireless devices are relatively limited. However, this is expected to change in the next (or third) generation of cellular/wireless technology, sometimes referred to as "3G" wireless/cellular, where much greater bandwidth will be available to each wireless device (i.e., 125 Kbps or greater). The higher data rates will make Internet applications for wireless devices much more common. For instance, a 3G cell phone (or a PC with a 3G cellular modem) may be used to browse web sites on the Internet, to transmit and receive graphics, to execute streaming audio or video applications, and the like. A much higher percentage of the wireless traffic handled by 3G cellular systems will be Internet protocol (IP) traffic and a lesser percentage will be traditional voice traffic.

Real-time streaming of multimedia content over Internet protocol (IP) networks has become an increasingly common application in recent years. As noted above, 3G wireless networks will provide streaming data (both video and audio) to wireless devices for real time applications. A wide range of interactive and non-interactive multimedia Internet applications, such as news on-demand, live TV viewing, video conferencing, live radio broadcasting (such as Broadcast.com), and the like, will provide "real time" data streaming to wireless devices. Unlike a "downloaded" video file, which may be retrieved first in "non-real" time and viewed or played back later, real time (or streaming) data applications require a data source to encode and to transmit a streaming data signal over a network to a receiver, which must decode and play the signal (video or audio) in real time.

Wireless service providers continually try to create new markets and to expand existing markets for wireless services and equipment. One important way to accomplish this is to improve the performance of wireless network equipment while making the equipment cheaper and more reliable. Doing this allows wireless service providers to reduce infrastructure and operating costs while maintaining or even increasing the capacity of their wireless networks. At the same time, the service providers are attempting to improve the quality of wireless service and increase the quantity of services available to the end user.

The mobile switching of a wireless network provides connections between a number of wireless network base stations and the public switched telephone network. Calls originated by or terminated at a cell phone or other mobile station are handled in the mobile station by a number of call processing client applications. A conventional mobile station typically contains a large switching fabric controlled by a main processing unit (MPU) that contains a large number of data processors and associated memories, often in the form of ASIC chips. Each of these MPU processors contains a call process client application for controlling the flow of control signals of a single call. Each call process client application in turn communicates with a call process server application that controls the flow of control signals for a large number of calls.

Thus, when a particular event occurs during a phone call (e.g., the call set-up, the invocation of three-way calling, call disconnection, or the like), control signals associated with the event are relayed from the mobile station to the call process client application in the mobile switching center (MSC). This call processing client application then relays the control signals to the call process server application, which actually performs the call processing service requested by the control signals.

Unfortunately, in large capacity systems, bottlenecks may develop around the call process server applications. Each call process client application must communicate with a particular piece of server hardware that is executing a call process server application. Due to the random nature of the start and stop of phone calls, in large system, some servers may be near capacity and develop bottlenecks, while other servers still have plenty of adequate bandwidth. Moreover, a system failure in a particular piece of server hardware results in the loss of all call processes being handled by a call process server application being executed on the failed server.

For each user in a telecommunication system there exists a set of data that constitutes a customer profile of the user. A customer profile contains information such as the user's name and address, what telecommunication system services the user is authorized to use, customer billing information, etc. When a user turns on a mobile station (such as a cell phone) a mobile switching center (MSC) caches the customer profile information into memory in anticipation of the user making a call. The amount of information in the customer profile may be quite large and require a large amount of memory. Because of the time required to load a large amount of customer profile data into memory, the customer profile data is loaded into memory at the time that the mobile station is turned on. A complete set of customer profile data is referred to as a subscriber database (SDB).

The mobile switching center (MSC) assigns either an International Mobile Station Identification (IMSI) number or a Temporary Mobile Station Identification (TMSI) number to the mobile station. For data related activity, the mobile switching center (MSC) assigns a packet based Temporary Mobile Station Identification (P-TMSI) number to the mobile station. The subscriber database (SDB) is associated with the identification number (IMSI, TMSI or P-TMSI) that the mobile switching center (MSC) assigns to the mobile station.

When the user makes a call from a mobile station (e.g., a cell phone) the call is routed to the mobile switching center (MSC) for registration. The mobile switching center (MSC) is capable of sending information to and receiving information from a subscriber database (SDB) server. The subscriber database (SDB) server is capable of receiving registration messages that are sent from a mobile station to the mobile switching center (MSC). The subscriber database (SDB) server registers a mobile station with its assigned home location register (HLR). The subscriber database (SDB) server is also capable of storing service profiles for each mobile station. The subscriber database (SDB) server is also capable of accessing the mobile switching center (MSC) to obtain a temporary routing number (e.g., IMSI) during an incoming call.

Prior art systems use a single subscriber database (SDB) server arranged in a primary-backup configuration. The primary-backup configuration reduces the danger that a single failure will disable the subscriber database (SDB) server. However, this simple primary-backup arrangement presents significant problems. First, the centralized subscriber database (SDB) server will be a potential bottleneck in the system. The capability of the subscriber database (SDB) server may not be sufficient to keep up with the demands placed upon it. Second, there may be performance issues in that the access time for the centralized subscriber database (SDB) server may be too slow for real time applications. Third, there may be memory constraints on the centralized subscriber database (SDB) server. There may be a limit on the number of subscribers that the centralized subscriber database (SDB) server can hold. The centralized subscriber database (SDB) server may not very scalable as more subscribers are added to the system. Lastly, the cost associated with a centralized subscriber database (SDB) server may be significant.

There is therefore a need in the art for an improved telecommunications network architecture that is capable of distributing and accessing subscriber database (SDB) information quickly and efficiently. In particular, there is a need in the art for an improved system and method for providing a subscriber database (SDB) server in a telecommunications network.

SUMMARY OF THE INVENTION

To address the above-discussed deficiencies of the prior art, it is a primary object of the present invention to provide an improved apparatus and method for distributing and accessing subscriber database (SDB) information quickly and efficiently within a telecommunication system.

A primary object of the present invention is to provide a switch capable of handling call connections between calling devices and called devices on a plurality of trunk lines associated with the switch. According to an advantageous embodiment of the present invention, the switch comprises: 1) a main processing unit capable of executing call processing applications, wherein each of the call processing applications is associated with one of the call connections; and 2) N call application nodes capable of executing subscriber database server applications, wherein a first subscriber database process server application is executed on a first one of the N call application nodes and is associated with a similar second subscriber database server application executed on a second one of the N call application nodes separate from the first call application node, the first and second call process server applications thereby forming a subscriber database load sharing group server application, wherein the each call processing application sends a subscriber database service request to the subscriber database load sharing group server application and the subscriber database load sharing group server application selects one of the first and second subscriber database server applications to perform the requested subscriber database service request according to a load distribution algorithm.

According to one embodiment of the present invention, the load distribution algorithm distributes new subscriber database service requests in an alternating manner between the first and second subscriber database server applications.

According to another embodiment of the present invention, the load distribution algorithm distributes new subscriber database service requests according to a current call process load of the first subscriber database server application and a current call process load of the second subscriber database server application.

According to still another embodiment of the present invention, the load distribution algorithm distributes the new subscriber database service requests in order to maintain the current call process load of the first subscriber database server application at a level substantially equal to the current call process load of the second subscriber database server application.

According to yet another embodiment of the present invention, the first subscriber database server application comprises a first primary-backup group server application, wherein the first primary-backup group server application comprises a first primary subscriber database server application executed on the first call application node and a first backup subscriber database server application associated with the first primary subscriber database server application.

According to a further embodiment of the present invention, state information associated with the first primary subscriber database server application is mirrored to the first backup subscriber database server application associated with the first primary subscriber database server application.

According to a still further embodiment of the present invention, the first backup subscriber database server application resides on the first call application node.

According to a yet further embodiment of the present invention, the first backup subscriber database server application resides on a call application node separate from the first call application node.

In one embodiment of the present invention, the second subscriber database server application comprises a second primary-backup group server application, wherein the second primary-backup group server application comprises a second primary subscriber database server application executed on the second call application node and a second backup subscriber database server application associated with the second primary subscriber database server application.

In another embodiment of the present invention, state information associated with the second primary subscriber database server application is mirrored to the second backup subscriber database server application associated with the second primary subscriber database server application.

In yet another embodiment of the present invention, the second backup subscriber database server application resides on the second call application node.

In still another embodiment of the present invention, the second backup subscriber database server application resides on a call application node separate from the second call application node.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior uses, as well as to future uses, of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. The principles of the present invention will be illustrated using a wireless telecommunications network. However, those skilled in the art will understand that the principles of the present invention may be implemented in any suitably arranged telecommunications network.

In the disclosure that follows, a group services framework for performing various distributed call processing functions is implemented in a mobile switching center of a wireless communication network. This is by way of illustration only and should not be construed so as to limit the scope of the invention. Those skilled in the art will understand that the group services framework described below may be implemented in other types of telecommunication devices, including many varieties of switches, routers and the like.

Figure 1:
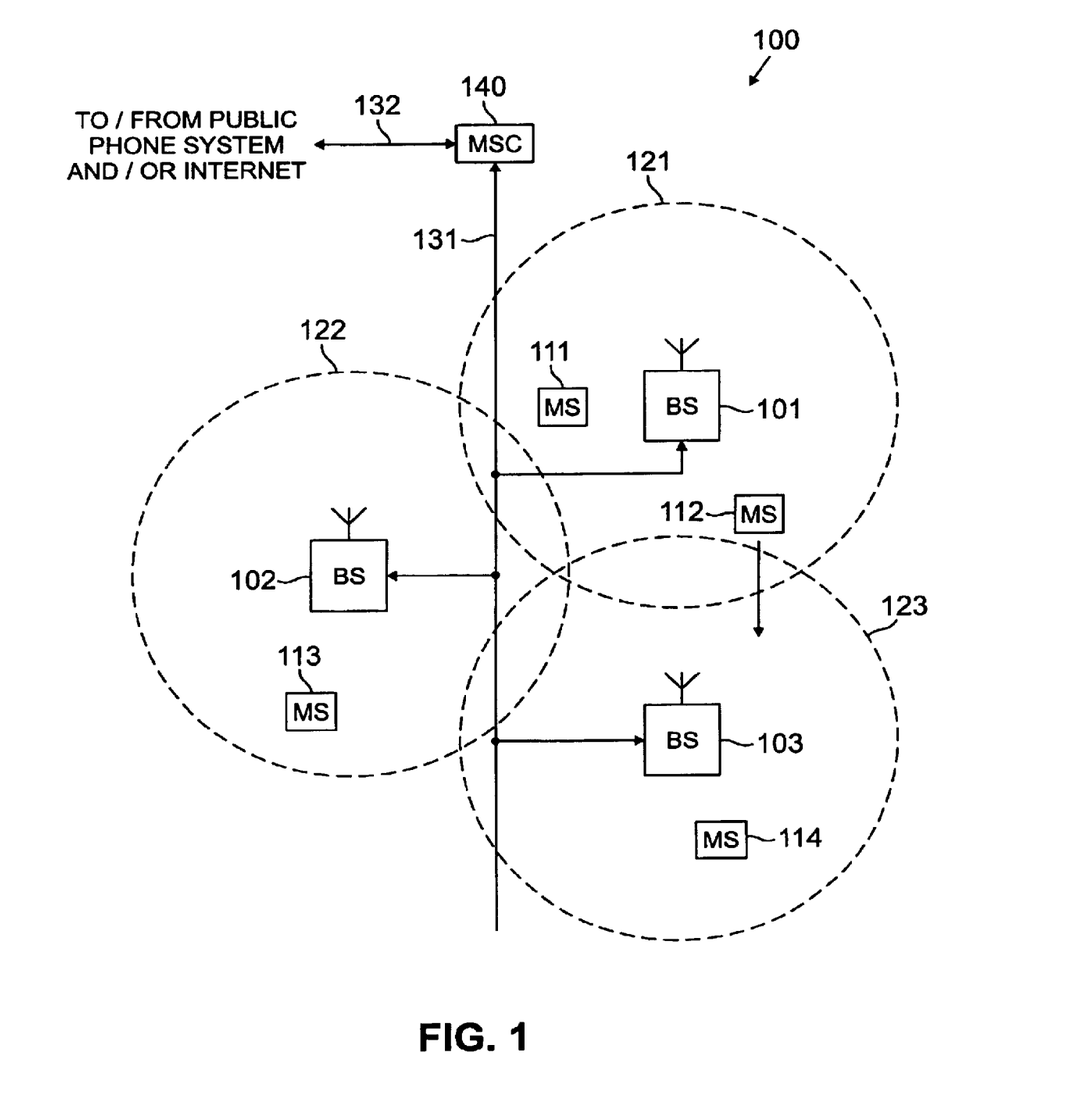
FIG. 1 illustrates an exemplary wireless network according to an advantageous embodiment of the present invention.

FIG. 1 illustrates an exemplary wireless network 100 according to one advantageous embodiment of the present invention. Wireless network 100 comprises a plurality of cell sites 121–123, each containing one of the base stations, BS 101, BS 102, or BS 103. Base stations 101–103 are operable to communicate with a plurality of mobile stations (MS) 111–114 over, for example, code division multiple access (CDMA) channels. Mobile stations 111–114 may be any suitable wireless communication devices, including conventional cellular telephones, PCS handset devices, personal digital assistants, portable computers, telemetry devices, and the like, which are capable of communicating with the base stations via wireless links. The present invention is not limited to mobile devices. Other types of access terminals, including wireless fixed access terminals, also may be used in wireless network 100. However, for the sake of simplicity, only mobile stations are shown and discussed hereafter.

Dotted lines show the approximate boundaries of the cell sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

As is well known in the art, cell sites 121–123 are comprised of a plurality of sectors (not shown), each sector being illuminated by a directional antenna coupled to the base station. The advantageous embodiment shown in FIG. 1 illustrates the base station in the center of the cell. Alternate advantageous embodiments position the directional antennas in corners of the sectors. The system of the present invention is not limited to any one cell site configuration.

In one advantageous embodiment of the present invention, each of the base stations BS 101, BS 102, and BS 103 comprise a base station controller (BSC) and one or more base transceiver subsystems (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces, and RF transmitters and RF receivers. For the purpose of simplicity and clarity in explaining the operation of the present invention, the base transceiver subsystem in each of cells 121, 122, and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication trunk lines 131, mobile switching center (MSC) 140, and communication trunk lines 132. Communication trunk lines 131 also provide connection paths to transfer control signals between MSC 140 and BS 101, BS 102 and BS 103 that are used to establish connections for voice and data circuits between MSC 140 and BS 101, BS 102 and BS 103 over communication trunk lines 131 and between MSC 140 and the Internet or the PSTN over communication trunk lines 132. In alternate advantageous embodiments of the present invention, communication trunk lines 131 may comprise several different data links, where each data link couples one of BS 101, BS 102, or BS 103 to MSC 140.

Communication trunk lines 131 and 132 comprise one or more of any suitable connection means, including a T1 line, a T3 line, a fiber optic link, a network packet data backbone connection, or any other type of data connection. Those skilled in the art will recognize that the connections on communication trunk lines 131 and 132 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communication trunk lines 131 and 132 may provide a transmission path for transmission of analog or digital control signals in a suitable signaling protocol.

Figure 2:
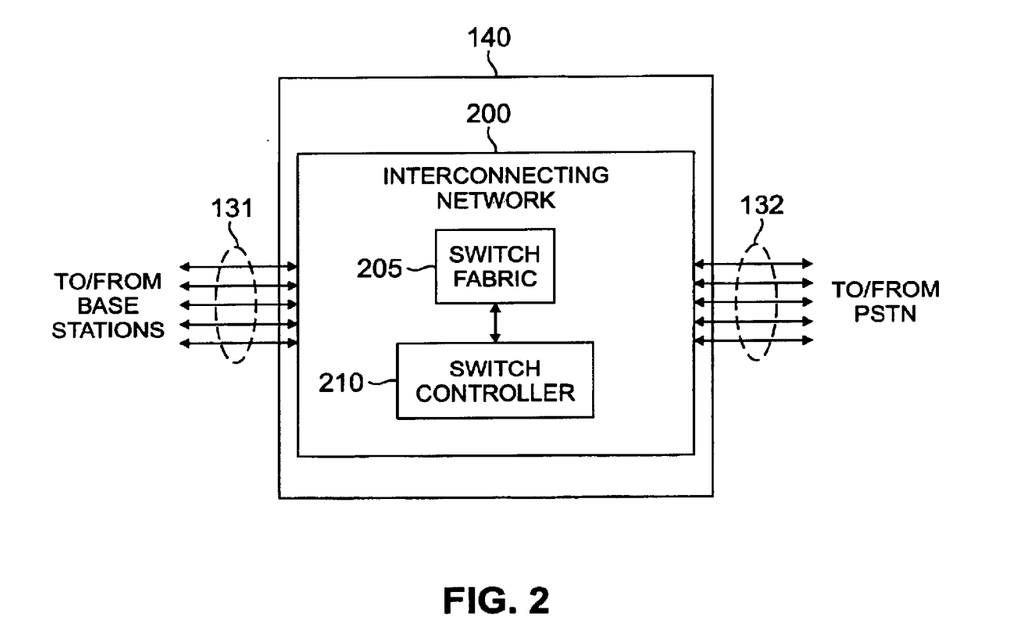
FIG. 2 illustrates an exemplary mobile switching center in greater detail according to an advantageous embodiment of the present invention.

FIG. 2 illustrates exemplary mobile switching center 140 in greater detail according to one embodiment of the present invention. MSC 140 includes interconnecting network 200, among other things. Interconnecting network 200 comprises switch fabric 205 and switch controller 210, which together provide switch paths between communication circuits in communication trunk lines 131 and 132. MSC 140 provides services and coordination between the subscribers in wireless network 100 and external networks, such as the PSTN or Internet. Mobile switching centers similar to MSC 140 are well known to those skilled in the art.

When a wireless network subscriber turns on his or her mobile station (i.e., cell phone) or fixed access terminal, radio messages over the air interface inform the base station that the mobile station (or fixed access terminal) is joining the network. However, a connection is not automatically made to voice or data traffic carrying circuits in communication trunk lines 131–132. A voice or data traffic connection to the public switched telephone network (PSTN) or the Internet is not needed until the subscriber places a call (i.e., dials a phone number) or accesses the Internet.

However, even when the phone is idle, certain information about the subscriber (e.g., subscriber data) must be retrieved and stored in either the base station or in MSC 140, or both, in order to authenticate the subscriber, gather billing information, identify the services available to the subscriber, determine capabilities of the mobile station, and the like. The control signals (as opposed to voice and data traffic) required to do this are also carried over communication trunk lines 131 and 132. After the subscriber data is stored in memory in MSC 140, it is available for use by a variety of call processing client (CPC) applications that may be initiated by the subscriber or another device while the mobile station is still active.

For example, when MS 111 is first turned ON, a call process is set up in MSC 140 for MS 111 and subscriber data (i.e., billing information) is stored in MSC 140 that may be accessed by the call process or other call applications that provide particular types of call services. If the subscriber dials a phone number on MS 111 or a call is received from the PSTN directed to MS 111, the call process for MS 111 handles the establishment of a call connection on one of the trunk lines in communication trunk lines 131 and one of the trunk lines in communication trunk lines 132. The MS 111 call process executed in MSC 140 maintains all state information related to the call and to MS 111 and handles all other applications required by MS 111, including three-way calls, voice mail, call disconnection, and the like.

In order to handle a large amount of call traffic, it is necessary to distribute the many active call processes and call service applications handled by MSC 111 across a number of call application nodes. The call services may include application for accessing a subscriber database, selecting (or de-selecting) communication trunk lines, retrieving and maintaining call identity information, and the like. The present invention provides an apparatus and method for distributing call processes and call service applications across multiple call application nodes in a highly reliable and redundant manner. This is accomplished by a distributed network of redundant servers in which call traffic is distributed in order to increase the call-handling capacity of MSC 140. The redundancy of the distributed servers is transparent to both the client applications that require a service and the server applications that provide the service. It also decreases the complexity of both the client and server applications.

Figure 3:
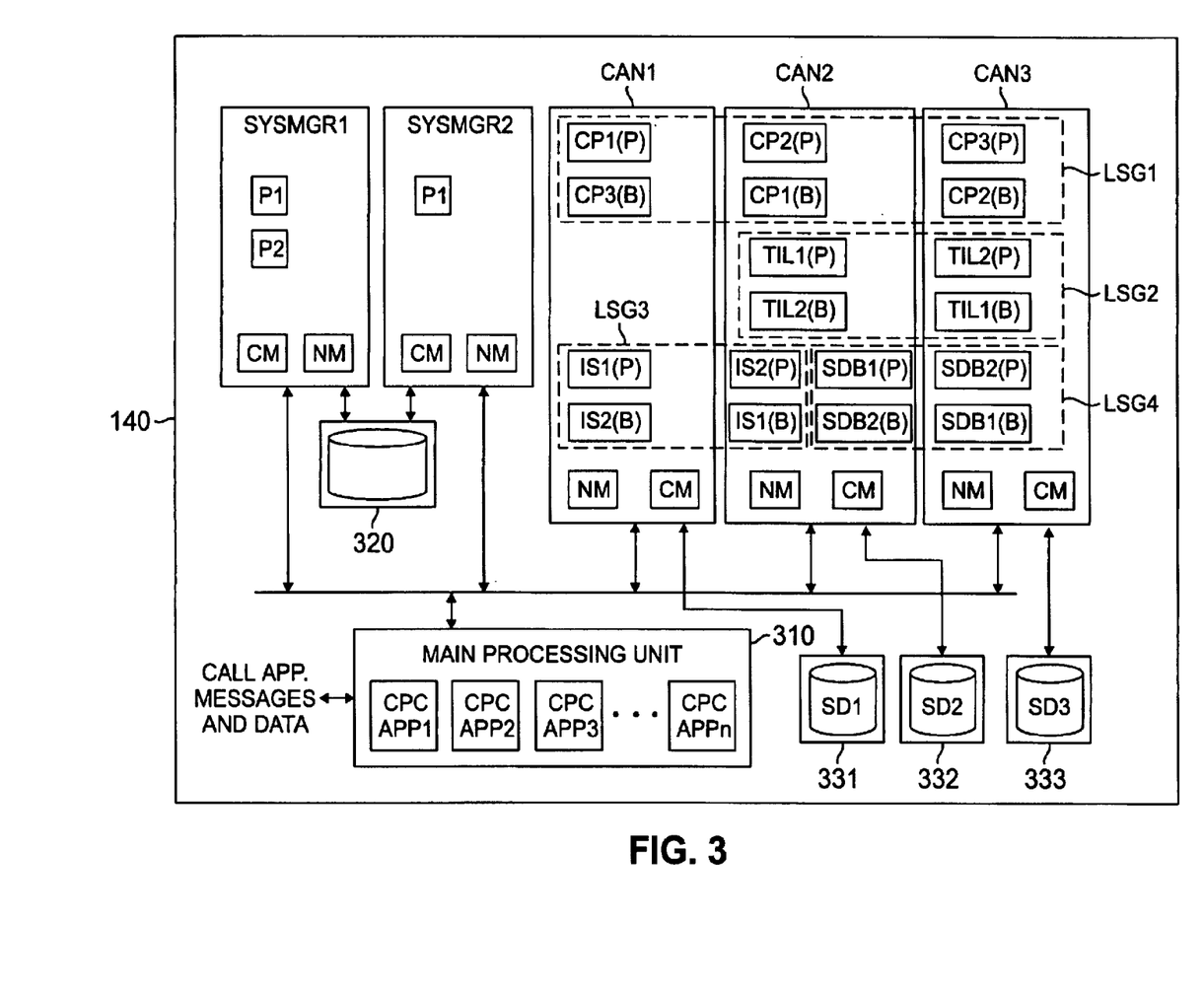
FIG. 3 illustrates selected portions of a mobile switching center that perform distributed call processing using group services according to the principles of the present invention.

FIG. 3 illustrates in greater detail selected portions of exemplary mobile switching center 140 that perform distributed call processing using group services in accordance with the principles of the present invention. MSC 140 comprises main processing unit 310, system manager node 1 (SYSMGR1), optional system manager node 2 (SYSMGR2), and master database 320. MSC 140 also comprises a plurality of call application nodes (CANs), including CAN1, CAN2, and CAN3, and a plurality of local storage devices (SDs), namely SD1, SD2, and SD3, that are associated with CAN1, CAN2 and CAN3. Master database 320 may be used as a master software repository to store databases, software images, server statistics, log-in data, and the like. SD1–SD3 may be used to store local capsules, transient data, and the like.

Each one of system manager nodes 1 and 2 and CAN1–CAN3 executes a configuration management (CM) process that sets up each node with the appropriate software and configuration data upon initial start-up or after a reboot. Each node also executes a node monitor (NM) process that loads software and tracks processes to determine if any process has failed. System manager nodes 1 and 2 execute a first arbitrary process, P1, and system manager node 1 also executes a second arbitrary process, P2.

In accordance with the principles of the present invention, call application nodes 1–3 (CAN1–CAN3) also execute a number of call processes (CP) that are organized as primary and backup processes that are available as distributed group services to 1 to N call process client (CPC) applications, namely CPC APP1–CPC APPn in main processing unit 310. For example, the N call application nodes (e.g., CAN1–CAN3) are separate computing nodes comprising a processor and memory that provide scalability and redundancy by the simple addition of more call application nodes.

Each of the N call process client (CPC) applications, namely CPC APP1–CPC APPn in MPU 310 handles the control signals and is messages related to a single call associated with a mobile station. Each of CPC APP1–CPC APPn establishes a session with a load sharing group, which assigns the call to a particular one of the primary-backup group call process server applications, CP1, CP2, or CP3. The selected call process server application actually performs the call process services/functions requested by the call process client application.

In the illustrated embodiment, three exemplary call process are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2 (P), and a backup process, CP2(B). CP3 exists as a primary process, CP3(P), and a backup process, CP3(B). In the illustrated advantageous embodiment, CP1(P) and CP1(B) reside on different call application nodes (i.e., CAN1 and CAN2). This is not a strict requirement. CP1(P) and CP1(B) may reside on the same call application node (e.g., CAN1) and still provide reliability and redundancy for software failures of the primary process, CP1(P). However, in an advantageous embodiment of the present invention, the primary process and the backup process reside on different call application nodes, thereby providing hardware redundancy as well as software redundancy. Thus, CP1(P) and CP1(B) reside on CAN1 and CAN2, CP2(P) and CP2(B) reside on CAN2 and CAN3, and CP3(P) and CP3(B) reside on CAN3 and CAN1.

Together, CP1, CP2 and CP3 form a supergroup for load sharing purposes. Thus, CP1(P) and CP1(B), CP2(P) and CP2(B), and CP3(P) and CP3(B) are part of a first load sharing group (LSG1), indicated by the dotted line boundary. Additionally, CAN1–CAN3 host three other load sharing groups, namely, LSG2, LSG3, and LSG4. LSG2 comprises two trunk idle list (TIL) processes, namely TIL1 and TIL2. TIL1 exists as a primary process, TIL1(P), on CAN2 and a backup process, TIL1(B), on CAN3. TIL2 exists as a primary process, TIL2(P), on CAN3 and a backup process, TIL2(B), on CAN2.

Similarly, LSG3 comprises two identity server (IS) processes, namely IS1 and IS2. IS1 exists as a primary process, IS1(P), on CAN1 and a backup process, IS1(B), on CAN2 and IS2 exists as a primary process, IS2(P), on CAN2 and a backup process, IS2(B), on CAN1.

Finally, LSG4 comprises two subscriber database (SDB) server applications, namely SDB1 and SDB2. SDB1 exists as a primary process, SDB1(P), on CAN2 and a backup process, SDB1(B), on CAN3 and SDB2 exists as a primary process, SDB2(P), on CAN3 and a backup process, SDB2(B), on CAN2.

A group service provides a framework for organizing a group of distributed software objects in a computing network. Each software object provides a service. In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Call processing server applications, such as CP1–CP3, IS1–IS2, and TIL1–TIL2, located within a computing network provide services that are invoked by client applications, such as CPC APP1–CPC APPn. As shown in FIG. 3, the call processing server applications are organized into primary-backup groups configured as a 1+1 type of primary-backup group. There are multiple numbers of these primary-backup groups and the exact number is scalable according to the number of processes and/or computing nodes (CANs) that are used. All of the primary-backup groups are themselves a member of a single load sharing group (e.g., LSG1, LSG2, LSG3, LSG4).

It is important to note that while the call process client applications, CPC APP1–CPC APPn, are clients with respect to the call process server applications, CP1, CP2, and CP3, a server application may be a client with respect to another server application. In particular, the call process server applications CP1–CP3 may be clients with respect to the trunk idle list server applications, TIL1 and TIL2, the subscriber database server applications, SDB1 and SDB2, and the identity server applications, IS1 and IS2.

A client application establishes an interface to the load sharing group. When a new call indication is received by the client application, the client application establishes a session with the load sharing group according to a client-side load sharing policy. The initial policy is round-robin, but other policies may be used that take into account the actual loading of the different primary-backup groups.

The client application associates the session with the new call and sends messages associated with the call over the session object. The client application also receives messages from the primary-backup group via the session established with the primary-backup group. Only the primary process (e.g., CP1(P)) of the primary-backup group joins the load sharing group (e.g., LSG1). For a variety of reasons, the application containing the primary may be removed from service. The server application may elect to not accept any new calls by leaving the load sharing group. However, the client applications may still maintain their session with the primary-backup group for existing calls. This action is taken because new call traffic may be lost if the singleton primary also fails. New calls are not distributed to the primary-backup group if it leaves the load sharing group.

If the primary of the primary-backup group that is a member of the load sharing group should fail, the backup member is informed that the primary member has failed (or left) and then assumes the role of primary member. The responsibility for these actions must be performed by the server application. It is the responsibility of the Group Service to inform the backup member that the primary member has failed or left.

As part of an online software upgrade process, one or more applications containing primary-backup groups may be removed from service, brought down, and then brought back up using a new version of software code. These groups, if their interface has not changed, join the existing load sharing group. When first started, it is required that the client interface be capable of throttling the call traffic to specific primary-backup groups. The traffic throttling is expressed as a percentage varying from 0% (no calls) to 100%. All new calls that would have been scheduled according to the scheduling algorithm are handled by this session. The throttling factor is initialized to 100% for any primary-backup group that joins the load sharing group. During on-line software upgrades, the throttling factor is adjusted to start with the no-calls case for the new software version. Any client application for the load sharing group may establish a session with a specific primary-backup group. The client may then change the throttling factor at any time. When the throttling factor is changed, all client session interfaces receive via multicast the changed throttling factor. As the throttling factor is increased, the call process server applications with the new software version may receive increasing amounts of call traffic.

Call processing communications from the client applications to the call processing server primary-backup groups must support a very high volume of calls. The group software utilizes an internal transport consisting of a multicasting protocol (simple IP multicast) and optionally a unicasting protocol. The unicasting protocol may be TCP/IP, SCTP, or other transport protocol. The multicast protocol is used for internal member communications relating to membership, state changes, and fault detection. In the absence of unicast transport, the multicast protocol is used for client/server communication streams. The unicast protocol, when provided, is used to provide a high-speed stream between clients and servers. The stream is always directed to the primary of a primary-backup group, which is transparent to both the call processing client application and the call process (e.g., CP1, CP2, CP3, TIL1, TIL2, IS1, IS2).

AS noted above, the call processes on the call application nodes (CANs) are organized into a load sharing group. Each call process (e.g., CP1, CP2, CP3, TIL1, TIL2, IS1, IS2) is itself a primary-backup group. Both members of the primary-backup group may provide the service but only the primary of the group receives messages and thus actually provides the service. When a member of the group is selected as the primary, it registers one or more interface streams for the group. Each stream is a separate interface for some call processing service.

The call processing client application (e.g., CPC APP1, CPC APP2) in MSC 140 receives a new call indication and uses the group service to select an interface with a call application node (i.e., server) to handle the new call. The call process on each server (CAN) is a member of a load sharing group and a particular call application node (CAN) is selected using a round-robin algorithm from the perspective of the call process client application. For the particular primary-backup group that is selected a session is returned to the call processing client application. When the session is established with the primary-backup call process server group, the call processing client application then opens an interface to a particular member (representing an interface to a primary-backup group) and obtains a session interface. Each call processing server sends a message related to the new call over the session interface. Any subsequent transactions associated with the call are sent over the same session object.

The call process server (i.e., primary-backup group) may send asynchronously messages over the session using one or more of the defined stream interfaces. The primary member of the call processing server group receives the transactions. The backup group member does not receive transactions. The primary group member sends updates to the backup group member. The primary group member decides when updates are sent to the backup group member. The primary starts sending updates when a call has been answered. Prior to the call being answered, the call is defined as being a transient call. After the call has been answered, the call is defined as being a stable call.

If the primary group member should fail, then the backup group member becomes the new primary member. All transient call information during the fail-over period (the time between when the primary fails and the backup is changed to be the new primary) can be lost. All stable call information must be maintained by the backup. However, some stable call information may be lost if the backup has not received updates.

Advantageously, the present invention has no limitations on the scalability of the system and the system size is hidden from both and the primary-backup group server applications and call process client applications. The present invention eliminates any single point of failure in the system. Any failure within the system will not affect the system availability and performance.

New call application nodes (CANs) and additional primary-backup group server applications (e.g., CP1, CP2, CP3, TIL1, TIL2, IS1, IS2) may be added dynamically to the load sharing groups and can start servicing new call traffic. Call process client applications are not affected by the additions of new servers. If a server should fail, its backup assumes responsibility for the load. This provides high availability for the servicing of each call and minimizes dropped calls.

Figure 4A:
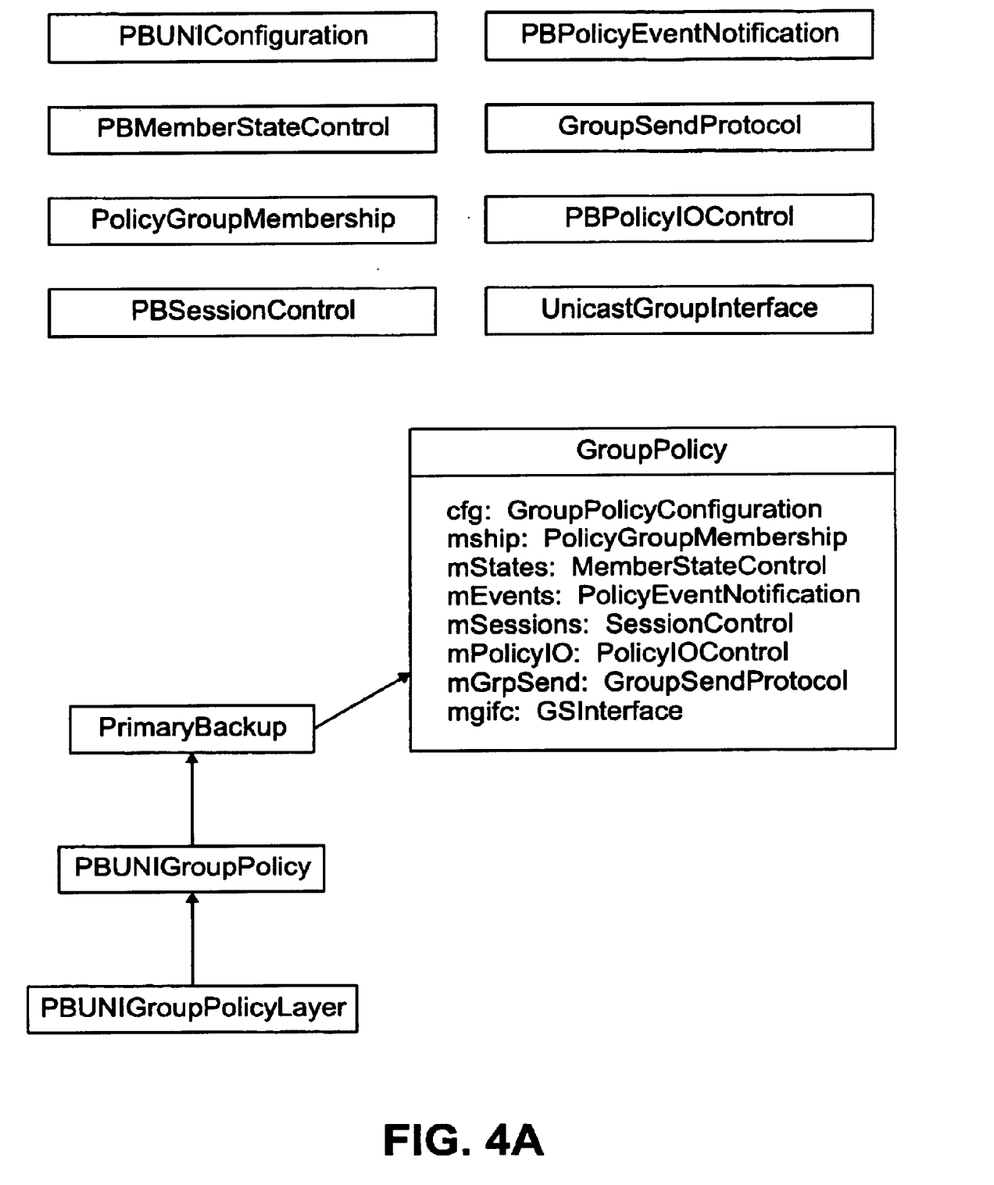
FIG. 4A is an illustration of server side internal group policy classes according to an advantageous embodiment of the present invention.
Figure 4B:
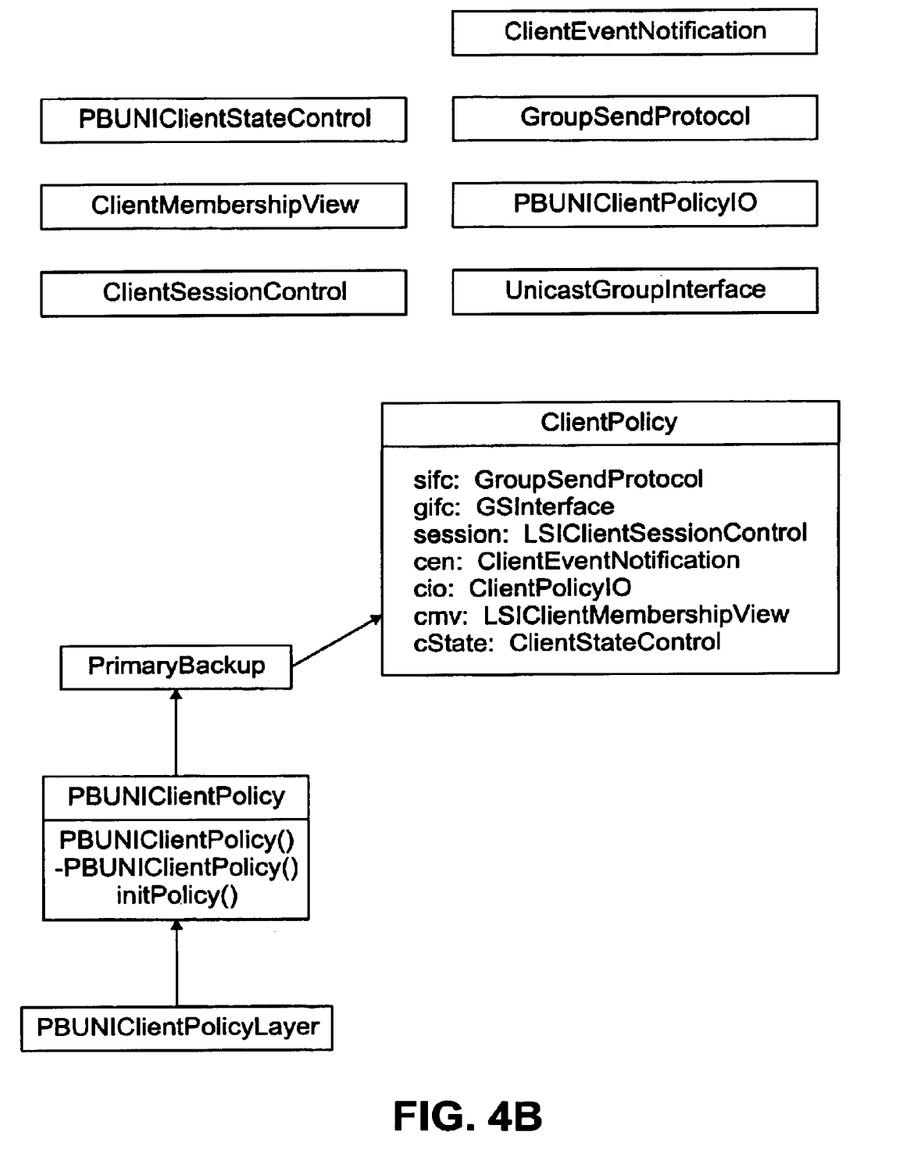
FIG. 4B is an illustration of a client side internal client policy architecture according to an advantageous embodiment of the present invention.
Figure 4C:
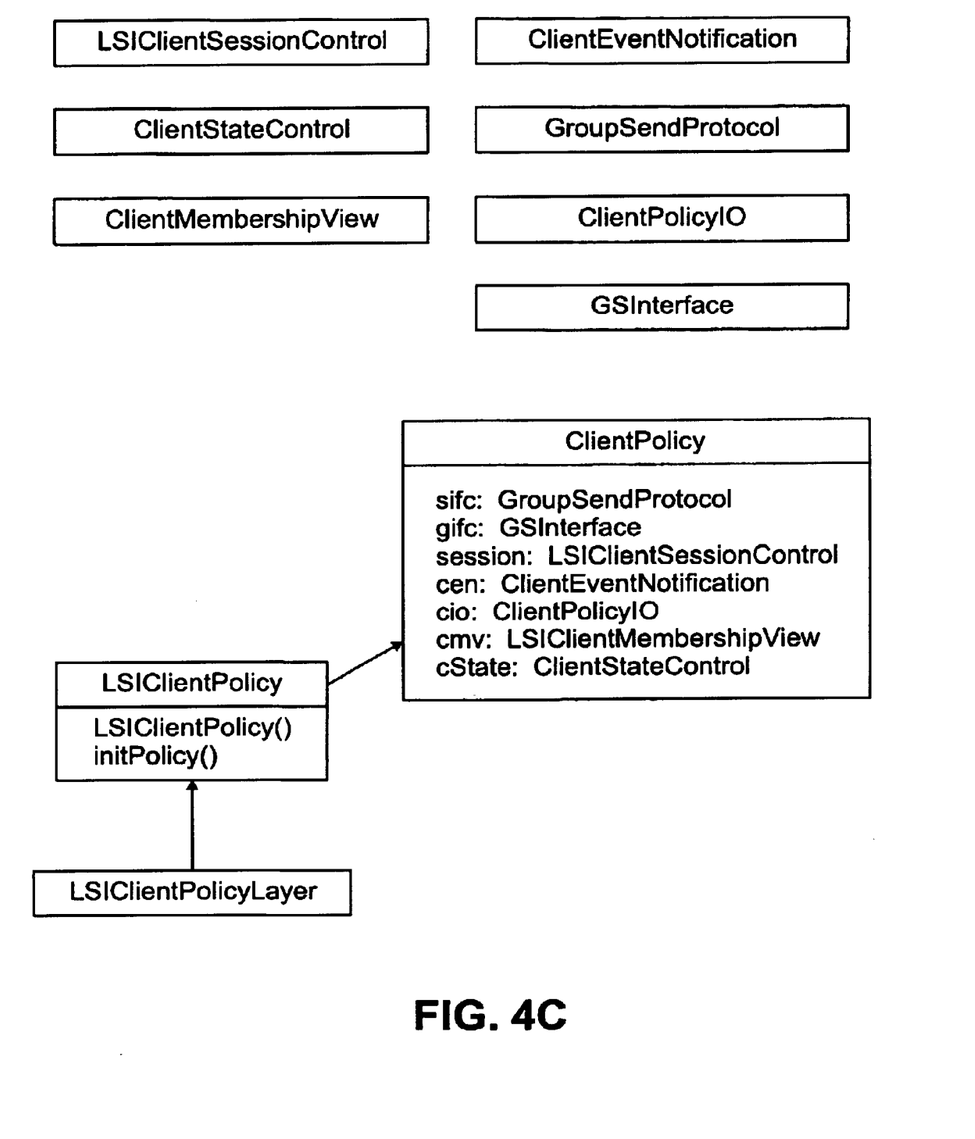
FIG. 4C is an illustration of a load sharing client side policy internal architecture according to an advantageous embodiment of the present invention.

FIG. 4A is an illustration of server side internal group policy classes according to an exemplary embodiment of the present invention. FIG. 4B is an illustration of a client side internal client policy architecture according to an exemplary embodiment of the present invention. FIG. 4C is an illustration of a load sharing client side policy internal architecture according to an exemplary embodiment of the present invention.

Server applications create a primary-backup group and then join the primary-backup group. This action creates the server side policy containing the objects shown in FIG. 4A. The group policy distributes invocations from clients, participates in a distributed election of the primary in the group, maintains group membership, and monitors for group member failures. Server applications join a load sharing group using a group adaptor object as a proxy member of the load sharing group. The group adaptor object is set with the name of the primary-backup group prior to joining the load sharing group.

Client applications establish a client interface to the load sharing group and begin by opening a session. The act of opening a session utilizes a client side load sharing policy to select one of the members of the load sharing group. The internal load sharing client policy architecture is shown in FIG. 4C. The session object itself encapsulates a client side policy that connects to a particular primary-backup group. The internal architecture for this client policy is shown in FIG. 4B.

Call processing client application communicate with the selected server (which is the primary within a primary-backup group). As the primary call process receives messages from the call processing client application, the primary call process sends state updates to the corresponding backup call process. If the primary call process should fail, the backup call process is automatically selected as the new primary. During the fail-over period to the new primary, the call processing client application receives an indication of the failure and may retry the send until the new primary call process is ready to receive messages. This minimizes the lost message traffic during the fail-over period. Once the call processing client application is through with the session, the call processing client application may release the session.

The PBUNIGroupPolicy group policy has the following internal member:

1) PBUNIConfiguration—identifies the group policy name as being "PBUNI" and specifies the QoS requirements for the communication stack for this policy.

2) PolicyGroupMembership—maintains the membership for the group and provides a membership protocol for adding new members, removing members that have left, and marking members that have failed as "FAILED".

3) PBPolicyEventNotification—provides the behavior for event notifications, such as i) when a member joins the group (recovered), ii) leaves the group (left), iii) fails (failed), or iv) has a state change.

4) PBMemberStateControl—has the state machine for primary selection in the presence of joins, exits, and failures of group members. Each local instance of this class decides which member is the primary. It is possible, due to network partitions, that there can be more than one primary at the same time.

5) PBSessionControl—controls the session establishment between call processing client applications for a primary-backup group and the group members.

6) PBPolicyIOControl—provides the primary-backup policy behavior for multicasting and sending to group members.

7) GroupSendProtocol—provides the group member protocol for sending to other members of the group and to clients of the group.

8) UnicastGroupInterface—is a group interface that provides separate interfaces to each capsule in which a group member resides.

PBUNIClientPolicy is a primary-backup client policy in which unicast links are used to communicate with the group. General sending is sent only to the primary member and is not redundantly sent to the backup member(s). The PBUNIClientPolicy has the following members:

1) ClientMembershipview—provides a local view of the group membership but unlike GroupMembershipView, does not participate in the protocol associated with group membership.

2) PBUNIClientPolicyIO—handles I/O over unicast links to the primary member.

3) GroupSendProtocol—provides the Group Member protocol for sending to other members of the group and to clients of the group.

4) ClientSessionControl—manages sessions on the client side with group members.

5) PBUNIClientStateControl—maintains a local view of which member is the primary in a primary-backup group.

6) ClientSessionControl—manages sessions on the client side with group members.

7) UnicastGroupInterface—provides separate interfaces to each capsule in which a group member resides.

LSIClientPolicy is a load sharing policy for group members who are themselves groups. LSIClientPolicy provides client-side round-robin selection of members when a session to a member is opened. Each session provides a group interface to a particular group. LSIClientPolicy also provides support of message throttling to each session. Throttling can vary from 0% (no messages) to 100% (all messages are sent that would normally be selected using round-robin scheduling). LSIClientPolicy overrides what is in the base ClientPolicy. LSIClientPolicy contains the following members:

1) LSIClientNotification—notifies both the ClientPolicy notifier and the local notifier of events.

2) LSIClientSessionControl—returns a session using a round-robin algorithm. The session provided is an interface to another group. LSISessionControl has a running index that is used to select a new session for each open session request. LSISessionControl has a list of known interfaces called "Member Known". Member Known is a map that is indexed by the Member ID and contains a SessionCount object which contains the actual session and a reference count of the number of users of the session instance. The sessions in known are maintained even though members may leave the group. When members leave the group they are removed from being available but kept in known. This permits clients to continue to use the group interface even though they have left the load sharing group.

3) GroupSendProtocol—provides the Group Member protocol for sending to other members of the group and to clients of the group.

4) GroupInterface—is the interface class to the multicast and/or unicast protocol stack(s) that are utilized by the group interfaces.

5) ClientPolicyIO—is responsible for handling client I/O.

6) ClientStateControl—is used to control the event state of the group and to retrieve the event state of the group.

For each user in a telecommunications network there exists a set of data that constitutes a customer profile of the user. A customer profile contains information such as the user's name and address, what telecommunications network services the user is authorized to use, customer billing information, etc. When a user turns on a mobile station (such as a cell phone) mobile switching center (MSC) 140 caches the customer profile information into memory in anticipation of the user making a call. The amount of information in the customer profile may be quite large and require a large amount of memory. Because of the time required to load a large amount of customer profile data into memory, the customer profile data is loaded into memory at the time that the mobile station is turned on. A complete set of customer profile data is referred to as a subscriber database (SDB).

Mobile switching center (MSC) 140 assigns either an International Mobile Station Identification (IMSI) number or a Temporary Mobile Station Identification (TMSI) number to a mobile station. For data related activity, mobile switching center (MSC) 140 assigns a packet based Temporary Mobile Station Identification (P-TMSI) number to the mobile station. The subscriber database (SDB) is associated with identification number (IMSI, TMSI or P-TMSI) that mobile switching center (MSC) 140 assigns to a mobile station. The comments set forth below regarding the IMSI numbers also relate to the TMSI numbers and to the P-TMSI numbers.

When the user makes a call from a mobile station (e.g., a cell phone) the call is routed to mobile switching center (MSC) 140 for registration. Mobile switching center (MSC) 140 is capable of sending information to and receiving information from the subscriber database (SDB) server applications in LSG4. The subscriber database (SDB) server applications in LSG4, SDB1 and SDB2, are capable of receiving registration messages that are sent from a mobile station to MSC 140. Subscriber database (SDB) server applications, SDB31 and SDB2, each register a mobile station with its assigned home location register (HLR) (not shown). The subscriber database (SDB) server applications, SDB1 and SDB2, are also each capable of storing service profiles for each mobile station. The subscriber database (SDB) server applications, SDB1 and SDB2, are also each capable of accessing MSC 140 to obtain a temporary routing number (e.g., IMSI) during an incoming call.

Prior art systems use a single subscriber database (SDB) server arranged in a primary-backup configuration. The primary-backup configuration reduces the danger that a single failure will disable the subscriber database (SDB). However, this simple primary-backup arrangement presents significant problems. First, the centralized subscriber database (SDB) server will be a potential bottleneck in the system. The capability of the subscriber database (SDB) server may not be sufficient to keep up with the demands placed upon it. Second, there may be performance issues in that the access time for the centralized subscriber database (SDB) server may be too slow for real time applications. Third, there may be memory constraints on the centralized subscriber database (SDB) server. There may be a limit on the number of subscribers that the centralized subscriber database (SDB) server can hold. The centralized subscriber database (SDB) server may not very scalable as more subscribers are added to the system. Lastly, the cost associated with a centralized subscriber database (SDB) server may be significant.

The present invention solves these problems associated with prior art systems by using the group services framework to distribute and access subscriber database (SDB) information quickly and efficiently. The group services framework provides a distributed set of subscriber database (SDB) servers. In particular, mobile switching center (MSC) 140 comprises load sharing group LSG4. Load sharing group LSG4 comprises subscriber database (SDB) server application SDB1 and subscriber database (SDB) server application SDB2. SDB1 comprises a primary SDB1(P) and a backup SDB1(B). Similarly, SDB2 comprises a primary SDB2(P) and a backup SDB2(B). The primary SDB1(P) and the primary SDB2(P) form an SDB super group. Each SDB server application, SDB1 and SDB2, is assigned a contiguous range of IMSI numbers.

When a call processing application (CPA) receives a call with a new IMSI number, the call processing application (CPA) opens a session specifying the IMSI number. The appropriate Group Service Client Policy uses the IMSI number to calculate an index that is associated with a specific subscriber database (SDB) server application (e.g., SDB1). The Group Service Client Policy sends the index to the call processing application (CPA) to give the call processing application (CPA) an interface to the appropriate subscriber database (SDB) server application. The call processing application (CPA) may then write to or read from the appropriate subscriber database (SDB) user entry.

Although the advantageous embodiment just described comprises two subscriber database (SDB) server applications, SDB1 and SDB2, the present invention is not limited to the use of two subscriber database (SDB) server applications. There is no limit or constraint on the number of subscriber database (SDB) server applications that may be a part of the subscriber database (SDB) group.

Each primary subscriber database (SDB) server application has a backup subscriber database (SDB) server application. The subscriber database (SDB) group service framework is capable of providing state updates to the backup subscriber database (SDB) server applications. If a primary subscriber database (SDB) server application fails, the present invention detects the failure and automatically switches over to the new primary subscriber database (SDB) server application (which was the former backup subscriber database (SDB) server application). The failover is transparent to call processing applications (CPA) or other client applications.

The present invention thus provides a scalable apparatus and method for operating a distributed subscriber database (SDB) in a telecommunications network. The subscriber database (SDB) of the present invention does not have a single point of failure. The subscriber database (SDB) of the present invention also does not allow a performance bottleneck to occur.

Figure 5:
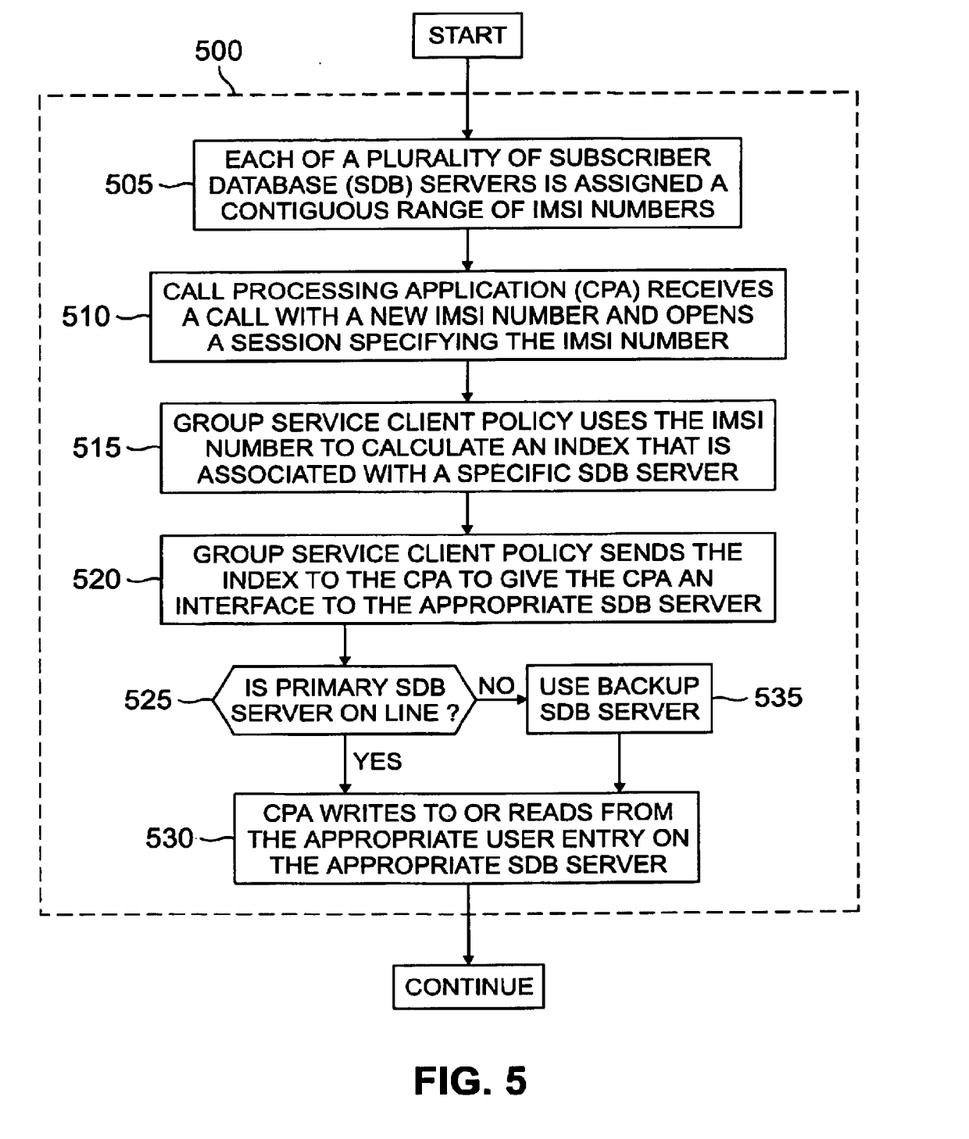
FIG. 5 is a flow chart illustrating the operation of an advantageous embodiment of a method of the present invention.

FIG. 5 illustrates a flow chart of the steps of one advantageous embodiment of the method of operation of the present invention. The steps of the method are generally denoted with the reference numeral 500. Each of a plurality of subscriber database (SDB) server applications is assigned a contiguous range of IMSI numbers (step 505). Call processing application (CPA) receives a call with a new IMSI number and opens a session specifying the IMSI number (step 510). The appropriate Group Service Client Policy uses the IMSI number to calculate an index that is associated with a specific subscriber database (SDB) server application (step 515). Group Service Client Policy then sends the index to the call processing application (CPA) to give the call processing application (CPA) an interface to the appropriate subscriber database (SDB) server application (step 520).

Mobile switching center (MSC) 140 then determines whether the primary subscriber database (SDB) server application is on line (decision step 525). If the primary subscriber database (SDB) server application is on line, then the call processing application (CPA) may write to or read from the appropriate subscriber database (SDB) user entry (step 530).

If the primary subscriber database (SDB) server application is not on line (i.e., the primary has failed), then mobile switching center (MSC) 140 uses the backup subscriber database (SDB) server application (step 535). Then the call processing application (CPA) may write to or read from the appropriate subscriber database (SDB) user entry (step 530).

Although the present invention has been described in detail, those skilled in the art should understand that they can make various changes, substitutions and alterations herein without departing from the spirit and scope of the invention in its broadest form.

What is claimed is:

1. A controller for providing a subscriber database associated with a switch, said switch capable of handling call connections between calling devices and called devices on a plurality of trunk lines associated with said switch, and said switch capable executing call processing applications, wherein each of said call processing applications is associated with one of said call connections, said controller comprising:

N call application nodes capable of executing a plurality of subscriber database server applications that connect a subscriber database to a call connection, wherein a first subscriber database server application is executed on a first one of said N call application nodes and is associated with a similar second subscriber database server application executed on a second one of said N call application nodes separate from said first call application node, said first and second subscriber database server applications thereby forming a subscriber database load sharing group server application, and wherein said each call processing application sends a subscriber database service request to said subscriber database load sharing group server application and said subscriber database load sharing group server application selects one of said first and second subscriber database server applications to perform said requested subscriber database service request according to a load distribution algorithm, and wherein said first subscriber database server application comprises a first primary-backup group server application that includes a first primary subscriber database server application executed on said first call application node and a first backup subscriber database server application associated with said first primary subscriber database server application, said first backup subscriber database server application residing on a call application node separate from said first call application node.

2. The controller as set forth in claim 1 wherein said load distribution algorithm distributes new subscriber database service requests in an alternating manner between said first and second subscriber database server applications.

3. The controller as set forth in claim 1 wherein said load distribution algorithm distributes new subscriber database service requests according to a current call process load of said first subscriber database server application and a current call process load of said second subscriber database server application.

4. The controller as set forth in claim 3 wherein said load distribution algorithm distributes said new subscriber database service requests in order to maintain said current call process load of said first subscriber database server application at a level substantially equal to said current call process load of said second subscriber database server application.

5. The controller as set forth in claim 1 wherein state information associated with said first primary subscriber database server application is mirrored to said first backup subscriber database server application associated with said first primary subscriber database server application.

6. The controller as set forth in claim 1 wherein said second subscriber database server application comprises a second primary-backup group server application, wherein said second primary-backup group server application comprises a second primary subscriber database server application executed on maid second call application node and a second backup subscriber database server application associated with said second primary subscriber database server application.

7. The controller as set forth in claim 6 wherein state information associated with said second primary subscriber database server application is mirrored to said second backup subscriber database server application associated with said second primary subscriber database server application.

8. The controller as set forth in claim 7 wherein said second backup subscriber database server application resides on said second call application node.

9. The controller as set forth in claim 8 wherein said second backup subscriber database server application resides on a call application node separate from said second call application node.

10. A wireless network comprising:

a plurality of base stations capable of communicating with a plurality of mobile stations in a coverage area of said wireless network; and a mobile switching center coupled to said plurality of base stations and to a public switched telephone network by a plurality of trunk lines, wherein said mobile switching center is capable of handling call connections between calling devices and called devices on said plurality of trunk lines, and wherein said mobile switching center is capable of executing call processing applications, wherein each of said call processing applications is associated with one of said call connections, wherein said mobile switching center comprises:

a controller for providing a subscriber database associated with said mobile switching center, wherein said controller comprises:

N call application nodes capable of executing call process server applications, wherein a first subscriber database server application is executed on a first one of said N call application nodes and is associated with a similar second subscriber database server application executed on a second one of said N call application nodes separate from said first call application node, said first and second subscriber database server applications thereby forming a subscriber database load sharing group server application, and wherein said each call processing application sends a subscriber database service request to said subscriber database load sharing group server application and said subscriber database load sharing group server application selects one of said first and second subscriber database server applications to perform said requested subscriber database service request according to a load distribution algorithm, and wherein said first subscriber database server application comprises a first primary-backup group server application that includes a first primary subscriber database server application executed on said first call application node and a first backup subscriber database server application associated with said first primary subscriber database server application, said first backup subscriber database server application residing on a call application node separate from said first call application node.

11. The wireless network as set forth in claim 10 wherein said load distribution algorithm distributes new subscriber database service requests in an alternating manner between said first and second subscriber database server applications.

12. The wireless network as set forth in claim 10 wherein said load distribution algorithm distributes new subscriber database service requests according to a current call process load of said first subscriber database server application and a current call process load of said second subscriber database server application.

13. The wireless network as set forth in claim 12 wherein said load distribution algorithm distributes said new subscriber database service requests in order to maintain said current call process load of said first subscriber database server application at a level substantially equal to said current call process load of said second subscriber database server application.

14. The wireless network as set forth in claim 10 wherein state information associated with said first primary subscriber database server application is mirrored to said first backup subscriber database server application associated with said first primary subscriber database server application.

15. The wireless network as set forth in claim 10 wherein said second subscriber database server application comprises a second primary-backup group server application, wherein said second primary-backup group server application comprises a second primary subscriber database server application executed on said second call application node and a second backup subscriber database server application associated with said second primary subscriber database server application.

16. The wireless network as set forth in claim 15 wherein state information associated with said second primary subscriber database server application is mirrored to said second backup subscriber database server application associated with said second primary subscriber database server application.

17. The wireless network as set forth in claim 16 wherein said second backup subscriber database server application resides on said second call application node.

18. The wireless network as set forth in claim 17 wherein said second backup subscriber database server application resides an a call application node separate from said second call application node.

19. A method for providing a subscriber database associated with a mobile switching center, for use in a wireless network comprising: 1) a plurality of base stations capable of communicating with a plurality of mobile stations in a coverage area of said wireless network; and 2) a mobile switching center coupled to said plurality of said base stations and to a public switched telephone network by a plurality of trunk lines, wherein said mobile switching center is capable of handling call connections between calling devices and called devices on said plurality of trunk lines, and wherein said mobile switching center is capable of executing call processing applications, wherein each of said call processing applications is associated with one of said call connections, the method comprising the steps of:

providing N call application nodes within said mobile switching center, said N call application nodes capable of executing a plurality of subscriber database server applications;

executing a first subscriber database server application on a first one of said N call application nodes;

executing a second subscriber database server application on a second one of said N call application nodes separate from said first call application node, said first and second subscriber database server applications thereby forming a subscriber database load sharing group server application;

sending a subscriber database service request from a call processing application to said subscriber database load sharing group server application;

selecting in said subscriber database load sharing group server application one of said first and second subscriber database server applications to perform said requested subscriber database service request; and performing said requested subscriber database service request according to a load distribution algorithm, wherein said first subscriber database server application comprises a first primary-backup group server application including a first primary subscriber database server application executed on said first call application node and a first backup subscriber database server application associated with said first primary subscriber database server application, said first backup subscriber database server application residing on a call application node separate from said first call application node.

20. The method as set forth in claim 19 further comprising the step of distributing new subscriber database service requests in an alternating manner between said first and second subscriber database server applications.

21. The method as set forth in claim 19 further comprising the step of distributing new subscriber database service requests according to a current call load process of said first subscriber database server application and a current call load process of said second subscriber database server application.

22. The method as set forth in claim 21 further comprising the step of distributing new subscriber database service requests in order to maintain said current call process load of said first subscriber database server application at a level substantially equal to said current call process load of said second subscriber database server application.

23. The method am set forth in claim 19 further comprising the step of mirroring state information associated with said first primary subscriber database server application to said first backup subscriber database server application associated with said first primary subscriber database server application.

24. The method as set forth in claim 19 wherein said second subscriber database server application comprises a second primary-backup group server application, wherein said second primary-backup group server application comprises a second primary subscriber database server application executed on said second call application node and a second backup subscriber database server application associated with said second primary subscriber database server application.

25. The method as set forth in claim 24 further comprising the step of mirroring state information associated with said second primary subscriber database server application to said second backup subscriber database server application associated with said second primary subscriber database server application.

26. The method as set forth in claim 25 wherein said second backup subscriber database server application resides on said second call application node.

27. The method as set forth in claim 26 wherein said second backup subscriber database server application resides on a call application node separate from said second call application node.

* * * * *

UNITED STATES PATENT AND TRADEMARK OFFICE
CERTIFICATE OF CORRECTION

PATENT NO. : 6,917,819 B2
DATED : July 12, 2005
INVENTOR(S) : David Allan Collins It is certified that error appears in the above-identified patent and that said Letters Patent is hereby corrected as shown below:

Column 13,
Line 59, delete "ClinetMembershipview" and replace with -- ClientMembershipView --.

Column 15,
Line 16, delete "SDB31" and replace with -- SDB1 --.

Column 17,
Line 61, delete "maid" and replace with -- said --.

Signed and Sealed this

Seventh Day of February, 2006

JON W. DUDAS
*Director of the United States Patent and Trademark Office*